(12) United States Patent
Yang et al.

(10) Patent No.: US 8,363,288 B2
(45) Date of Patent: Jan. 29, 2013

(54) SCANNING DEVICE

(75) Inventors: Liu-Zhi Yang, Suzhou (CN); Zhi-Hai Zhang, Suzhou (CN)

(73) Assignee: QISDA (Suzhou) Co., Ltd, Suzhou, Jiangsu Province (CN)

( * ) Notice: Subject to any disclaimer, the term of this patent is extended or adjusted under 35 U.S.C. 154(b) by 418 days.

(21) Appl. No.: 12/814,482

(22) Filed: Jun. 13, 2010

(65) Prior Publication Data

US 2011/0032582 A1 Feb. 10, 2011

(30) Foreign Application Priority Data

Aug. 4, 2009 (CN) .......................... 2009 1 0163828

(51) Int. Cl.
*H04N 1/04* (2006.01)
*G03G 15/00* (2006.01)

(52) U.S. Cl. ......... 358/474; 358/496; 358/498; 399/367

(58) Field of Classification Search .................. 399/367; 358/474, 496, 498
See application file for complete search history.

(56) References Cited

U.S. PATENT DOCUMENTS

| | | | |
|---|---|---|---|
| 5,610,731 A | 3/1997 | Itoh | |
| 5,734,483 A * | 3/1998 | Itoh | 358/496 |
| 5,878,319 A * | 3/1999 | Itoh | 399/367 |
| 2002/0036809 A1* | 3/2002 | Tohyama et al. | 358/498 |
| 2002/0109868 A1 | 8/2002 | Yokota et al. | |
| 2003/0038991 A1 | 2/2003 | Yoshida | |
| 2004/0165227 A1* | 8/2004 | Makino et al. | 358/474 |
| 2004/0223192 A1* | 11/2004 | Hiromatsu et al. | 358/474 |
| 2007/0146828 A1* | 6/2007 | Lee | 358/498 |
| 2012/0002252 A1* | 1/2012 | Kubo et al. | 358/498 |

FOREIGN PATENT DOCUMENTS

| | | |
|---|---|---|
| CN | 99200736.4 | 3/2000 |
| CN | 01131361.7 | 4/2003 |
| CN | 02242454.7 | 6/2003 |

\* cited by examiner

*Primary Examiner* — Charlotte M Baker
*Assistant Examiner* — Rury Grisham

(57) ABSTRACT

The invention is directed to a scanning device including an image sensing module, a first carrier, a second carrier and a holder. The image sensing module includes an image sensor for reading the image of an original document. The first carrier is for carrying the original document in a dynamic scanning mode. The second carrier is for carrying the original document in a static scanning mode. The holder, used for fixing the first carrier and the second carrier, includes a transitional portion disposed between the first carrier and the second carrier. There are a first distance between the image sensor and the bottom surface of the first carrier and a second distance between the image sensor and the bottom surface of the second carrier, wherein the first distance is greater than the second distance. The dual-mode design facilitates the assembly of carriers and avoids the dust entering the scanning device.

14 Claims, 2 Drawing Sheets

SCANNING DEVICE

This application claims the benefit of People's Republic of China application Serial No. 200910163828.8, filed Aug. 4, 2009, the subject matter of which is incorporated herein by reference.

BACKGROUND OF THE INVENTION

1. Field of the Invention

The invention relates in general to a scanning device, and more particularly to a scanning device with two scanning modes and the carriers used in the scanning device have different thicknesses or refractive indexes.

2. Description of the Related Art

Nowadays, the scanning device has been widely used in a wide range of office equipment such as scanners, copiers, and multi-functional machines. Along with the advance technology, the scanning device with dual-scanning modes is also provided. One of the two modes is a static scanning mode, which scans the original document placed on the glass carrier by moving the imaging module. The other mode is a dynamic scanning mode, which uses the imaging module, being static, to scan the original document moved in different regions of the same or a different glass carrier by a device such as an automatic document feeder (ADF).

There imaging module has two types, namely, the charge coupling device (CCD) scanning module and the contact image sensor (CIS) scanning module. The CCD module has a larger depth, so the two glass carriers corresponding to the two scanning modes can be designed to be stacked or parallel in the scanning device. However, the CCD module is disadvantaged by having a huge volume and cannot meet the requirement of miniaturization. To the contrary, the CIS module, being small in size and compact in structure, meets the requirement of miniaturization. However, due to the shallow depth, the glass carrier of the CIS module corresponding to the two scanning modes cannot be designed as a stacked structure.

Referring to FIG. 1A and FIG. 1B. FIG. 1A and FIG. 1B respectively show the scanning device 1 according to prior art. The scanning device 1 includes a CIS module 10, a first carrier 11, a second carrier 12 and a holder 13. The CIS module 10 is for reading the image of an original document. The first carrier 11 is for carrying the original document in a dynamic scanning mode. The second carrier 12 is for carrying the original document in a static scanning mode. The holder 13, used for fixing the first carrier 11 and the second carrier 12, includes a transitional portion 131 disposed between the first carrier 11 and the second carrier 12. The first carrier 11 and the second carrier 12 are disposed in the scanning device 1 in parallel. Since the two glass carriers have the same thickness and the glass has the same refractive index, when the CIS module 10 is moved between the underneath of the first carrier 11 and the underneath of the second carrier 12, the design requirement of the CIS module's depth will be satisfied as long as the distance between the CIS module 10 and the bottom surface of the carrier remains the same. Despite such structural design is simple, the first carrier 11 and the holder 13 are hard to be fixed. As indicated in FIG. 1B, firstly, to assure paper jam will not occur to the original document, the corner above the carrier must have a positive flushness in the feeding direction Z of the original document. Next, due to the structure of the CIS module 10 and the design of crossing over the transitional portion 131, the transitional portion 131 of the holder 13 cannot be extended towards the underneath of the first carrier 11 to support the first carrier 11. One of the currently used methods is to fix the first carrier 11 with glue. However, such method is troublesome and is inconvenient for the assembly of the product. Moreover, since the gap between the first carrier 11 and the holder 13 is interconnected to the inside of the scanning device 1, the dust may easily enter the scanning device through the gap so as to deteriorate the quality of image scanning.

SUMMARY OF THE INVENTION

The invention resolves the above technical problems through the dual-carrier design, which not only assures the achievement of dual scanning modes but also facilitates the assembly of products and avoids the dust entering the scanning device.

The scanning device of the invention includes an image sensing module, a first carrier, a second carrier and a holder. The image sensing module includes an image sensor for reading the image of an original document. The first carrier is for carrying the original document in a dynamic scanning mode, wherein in the dynamic scanning mode, the image sensing module remains still but the original document moves. The second carrier is for carrying the original document in a static scanning mode, wherein in the static scanning mode, the image sensing module moves but the original document remains still. The holder, used for fixing the first carrier and the second carrier, includes a transitional portion disposed between the first carrier and the second carrier. There are a first distance between the image sensor and the bottom surface of the first carrier and a second distance between the image sensor and the bottom surface of the second carrier, wherein the first distance is greater than the second distance.

According to the scanning device of the invention, the first carrier has a first thickness, the second carrier has a second thickness, and the first thickness is smaller than the second thickness.

According to the scanning device of the invention, the first carrier has a first refractive index, the second carrier has a second refractive index, and the first refractive index is greater than the second refractive index.

The scanning device of the invention further includes a driving unit for driving the image sensing module to move between the underneath of the first carrier and the underneath of the second carrier along a first direction, wherein during the course of movement, the image sensing module crosses over the transitional portion.

According to the scanning device of the invention, the image sensor is a contact image sensor, or, both the first carrier and the second carrier are transparent glasses.

According to the scanning device of the invention, the transitional portion has a latch, which supports the first carrier. Furthermore, the bottom surface of the latch is aligned with or higher than that of the second carrier.

Besides, the image sensing module further includes a spacer disposed at the two ends of the contact image sensor. Furthermore, the spacer is a slide block or a roller. Or, the scanning device of the invention further includes a guide rail disposed under the first carrier or at the two sides thereof, wherein the spacer is correspondingly disposed on the guide rail.

According to the scanning device of the invention, the spacer includes a first roller and a second roller, wherein the second roller is disposed between the first roller and the contact image sensor, and the diameter of the first roller is greater than that of the second roller.

Furthermore, in the dynamic scanning mode, the first roller contacts the first carrier, but the second roller does not contact the first carrier. In the static scanning mode, the second roller contacts the second carrier, but the first roller is suspended.

Furthermore, the first carrier has a first width, the second carrier has a second width, and the first width is greater than the second width.

Furthermore, the scanning device further includes a transitional wedge disposed between the first carrier and the second carrier and located at the two sides of the transitional portion, and when the image sensing module crosses over the transitional portion, the first roller contacts the transitional wedge.

The invention not only assures the achievement of dual-mode scanning but also facilitates the assembly of products and avoids the dust entering the scanning device.

The invention will become apparent from the following detailed description of the preferred but non-limiting embodiments. The following description is made with reference to the accompanying drawings.

DETAILED DESCRIPTION OF THE INVENTION

Detailed descriptions of the objects, structures, technical features and functions of the invention are disclosed in a number of embodiments below. It is noted that the glossary, such as "up", "down", "left", "right", "front", "rear", used in the text of the invention is for describing the connection and correspondence between the elements according to conventional disposition of the scanning device or the relative locations between the elements in the accompanying drawings, not for limiting the scope of protection of the invention.

Figure 1A:
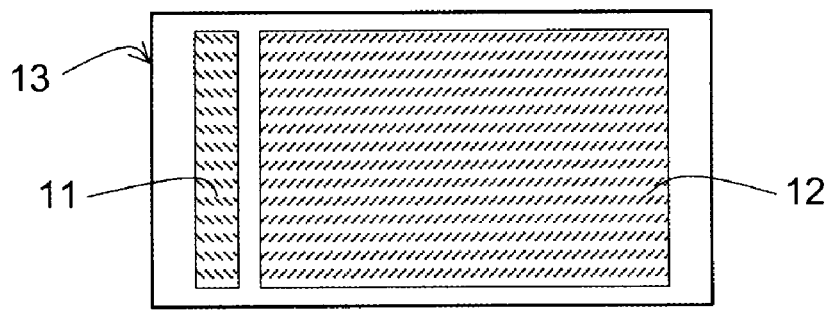
FIG. 1A and FIG. 1B respectively show a scanning device according to the prior art.
Figure 1B:
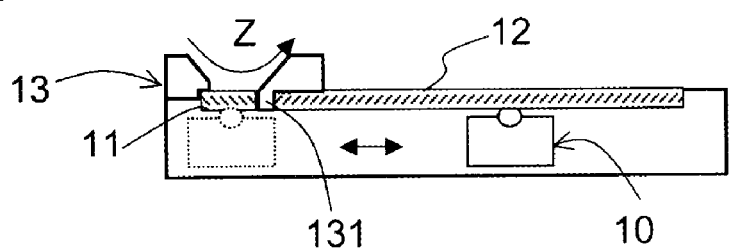
Figure 2:
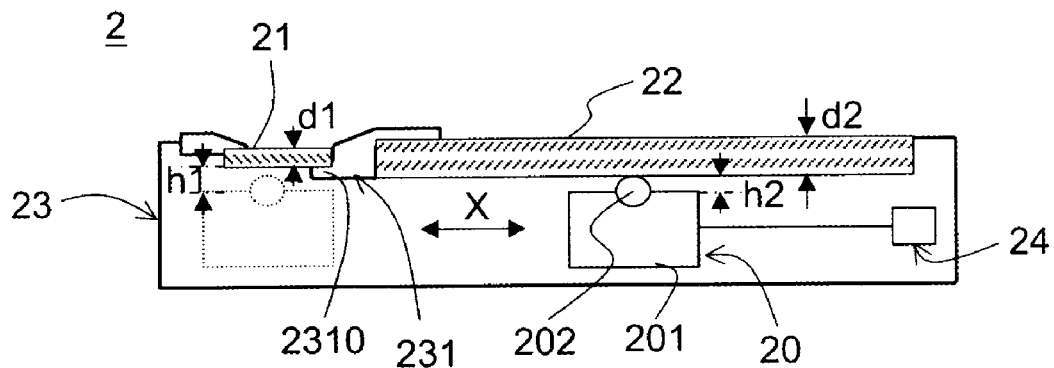
FIG. 2 shows a scanning device according to an embodiment of the invention.

Referring to FIG. 2, a scanning device 2 according to an embodiment of the invention is shown. The scanning device 2 includes an image sensing module 20, a first carrier 21, a second carrier 22 and a holder 23. The image sensing module 20 includes an image sensor 201 for reading the image of an original document. The first carrier 21 is for carrying the original document in a dynamic scanning mode, wherein in the dynamic scanning mode, the image sensing module 20 (denoted by dotted lines in FIG. 2) remains still but the original document moves. The second carrier 22 is for carrying the original document in a static scanning mode, wherein in the static scanning mode, the image sensing module 20 moves but the original document remains still. The holder 23, used for fixing the first carrier 21 and the second carrier 22, includes a transitional portion 231 disposed between the first carrier 21 and the second carrier 22. There are a first distance h1 between the image sensor 201 and the bottom surface of the first carrier 21 and a second distance h2 between the image sensor 201 and the bottom surface of the second carrier 22, and the first distance h1 is greater than the second distance h2.

In the two modes of scanning, the same image sensing module 20 is used, so the image sensor 201 has to satisfy the requirement of forming the image of an original document at different distances. Furthermore, suppose the first carrier 21 has a first refractive index n1 and a first thickness d1, and the second carrier 22 has a second refractive index n2 and a second thickness d2, then the following formula, that is, h1+d1/n1=h2+d2/n2, needs to be satisfied.

Since it is already determined that h1>h2, if d1=d2, then n1>n2, and if n1=n2, then d1<d2. It is noted that the thicknesses and the refractive indexes of the two carriers as well as the distances from the image sensor to the carriers can have many implementations according to the above formula, and the invention is not limited thereto.

In an embodiment, the first carrier 21 can be a lanthanum (La) glass with a higher refractive index which is about 1.9, and the second carrier 22 can be a fluorine crown glass with a low refractive index which is about 1.4, so the first refractive index of the first carrier 21 is greater than the second refractive index of the second carrier 22. Under the circumstance that the two carriers have the same thickness, the first distance h1 disclosed in the embodiment satisfies the requirement of being greater than the second distance h2. To increase the selection range of the material for forming the carriers, in yet another embodiment, the first carrier 21 can be a lanthanum (La) glass with a higher refractive index which ranges between 1.6~1.9, and has a first thickness, and the second carrier 22 can be made from a transparent material with a lower refractive index. For example, the second carrier 22, which can be formed by a fluorine crown glass or made from plastics such as PC (polycarbonate), has a refractive index ranging between 1.4~1.5 and has a second thickness. Under the circumstance that the first thickness is smaller than or equal to the second thickness, the first distance h1 disclosed in the embodiment still satisfies the requirement of being greater than the second distance h2.

Continue to refer to FIG. 2. In another embodiment, the first carrier 21 has a first thickness d1, the second carrier 22 has a second thickness d2, and the first thickness d1 is smaller than the second thickness d2. In practical application, both the first carrier 21 and the second carrier 22 are formed by a transparent glass and have the same refractive index. It is noted that the first carrier 21 and the second carrier 22 can be formed by other transparent materials or even have different refractive indexes, and the invention is not limited thereto.

In the above embodiments, the scanning device 2 further includes a driving unit 24 for driving the image sensing module 20 to move between the underneath of the first carrier 21 and the underneath of the second carrier 22 along a first direction X, wherein during the course of movement, the image sensing module 20 crosses over the transitional portion 231. The image sensor 201 is a contact image sensor (CIS). Despite the following disclosure is exemplified by the CIS sensing module, other types of sensors especially those with a larger depth still can be adapted in the scanning device of the invention.

Continue to refer to FIG. 2. In yet another embodiment, the transitional portion 231 has a latch 2310, which supports the first carrier 21. A double-sided tape can be applied on the part of the first carrier 21 supported by the latch 2310 for fixing the first carrier 21 and at the same time avoiding the dust entering the scanning device 2. In practical application, the bottom surface of the latch 2310 is aligned with or higher than that of the second carrier 22. Since the first carrier 21 has a small thickness, the bottom surface of the latch 2310 can be designed to be not exceeding the bottom surface of the second carrier 22, so that during the course of movement, the image sensing module 20 will not interfere with the latch 2310. That is, the invention can adapt ordinary CIS module, so the cost can be reduced.

In the above embodiments, the image sensing module 20 further includes a spacer 202 disposed at the two ends of the contact image sensor 201. In practical application, the spacer 202 can be a slide block or a roller.

Figure 3:
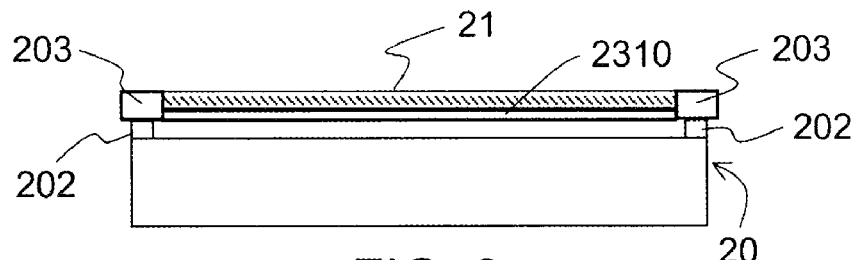
FIG. 3 is an embodiment showing the spacer and the guide rail of FIG. 2 operating in coordination.
Figure 4:
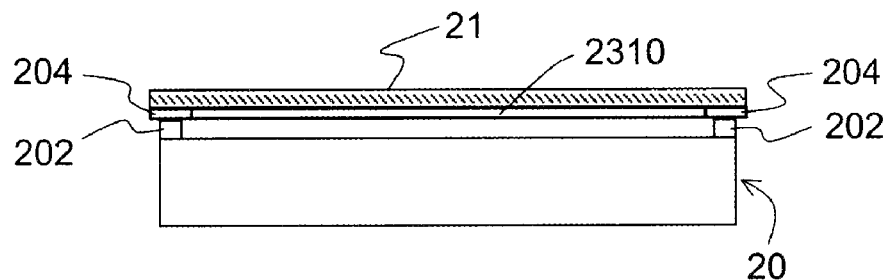
FIG. 4 is another embodiment showing the spacer and the guide rail of FIG. 2 operating in coordination.

Referring to FIG. 3 and FIG. 4. FIG. 3 is an embodiment showing the spacer 202 of FIG. 2 and the guide rail 203 (not illustrated in FIG. 2) operating in coordination. FIG. 4 is another embodiment showing the spacer 202 of FIG. 2 and the guide rail 203 (not illustrated in FIG. 2) operating in coordination. The scanning device of the two embodiments further includes a guide rail 203 or 204. The spacer 202 is correspondingly disposed on the guide rail 203 or 204. As indicated in FIG. 3, the guide rail 203 is disposed at the two sides of the first carrier 21, the bottom surface of the guide rail 203 is basically aligned with that of the latch 2310, and when the image sensing module 20 crosses over the latch 2310, the spacer 202 contacts and passes through the guide rail 203. As indicated in FIG. 4, the guide rail 204 is disposed under the first carrier 21 and located at the two sides of the latch 2310, the bottom surface of the guide rail 204 is basically aligned with that of the latch 2310, and when the image sensing module 20 crosses over the latch 2310, the spacer 202 contacts and passes through the guide rail 204. In the above embodiments, the spacer 202 can be a slide block or a roller.

Figure 5:
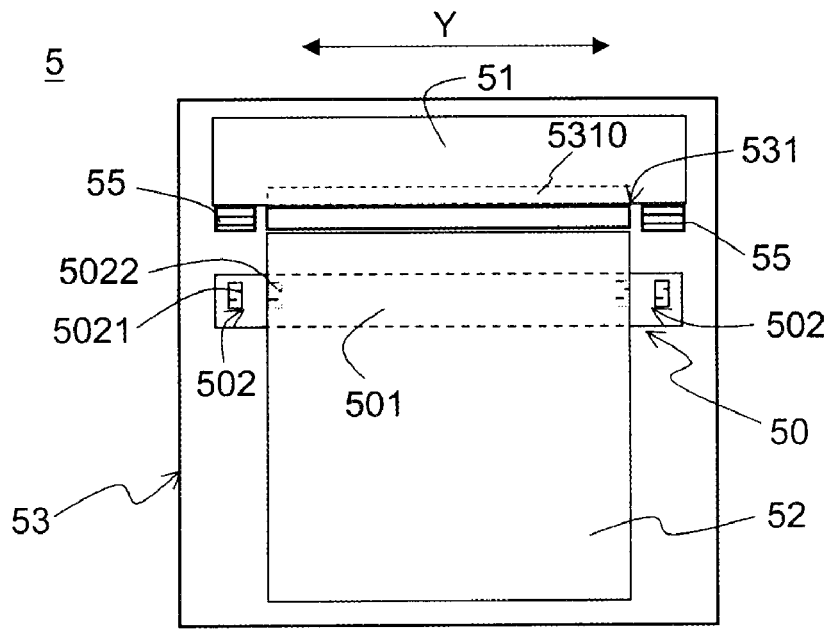
FIG. 5 shows a scanning device according to another embodiment of the invention.

Referring to FIG. 5, a scanning device 5 according to another embodiment of the invention is shown. The scanning device 5 includes an image sensing module 50, a first carrier 51, a second carrier 52 and a holder 53. The image sensing module 50, used for reading the image of an original document, includes a contact image sensor 501 located under the second carrier 52 and denoted by dotted lines as indicated in FIG. 5 and a spacer 502 disposed at the two ends of the contact image sensor 501. The first carrier 51 is for carrying the original document in a dynamic scanning mode, wherein in the dynamic scanning mode, the image sensing module 50 remains still but the original document moves. The second carrier 52 is for carrying the original document in a static scanning mode, wherein in the static scanning mode, the image sensing module 50 moves but the original document remains still. The holder 53, used for fixing the first carrier 51 and the second carrier 52, includes a transitional portion 531 disposed between the first carrier 51 and the second carrier 52. There are a first distance between the contact image sensor 501 and the bottom surface of the first carrier 51 and a second distance between the contact image sensor 501 and the bottom surface of the second carrier 52, wherein the first distance is greater than the second distance.

In the embodiment, the spacer 502 includes a first roller 5021 and a second roller 5022, wherein the second roller 5022 is disposed between the first roller 5021 and the contact image sensor 501, and the diameter of the first roller 5021 is greater than that of the second roller 5022. In a dynamic scanning mode, the image sensing module 50 is moved to the underneath of the first carrier 51, the first roller 5021 contacts the first carrier 51, but the second roller 5022, having a small diameter, does not contact the first carrier 51 for the time being. In a static scanning mode, the image sensing module 50 is moved to the underneath of the second carrier 52, the second roller 5022 contacts the second carrier 52, and the first roller 5021 is suspended. In other words, the first roller 5021 does not contact the second carrier 52. To achieve the above design, the first carrier 51 has a first width along the Y direction, the second carrier 52 has a second width along the Y direction, and the first width is greater than the second width. The structural design of the scanning device is not limited to the above exemplification, and any design capable of achieving the above effect will do.

To assure that the image sensing module 50 passes through the transitional portion 531, the scanning device 5 further includes a transitional wedge 55 disposed between the first carrier 51 and the second carrier 52 and located at the two sides of the transitional portion 531, and when the image sensing module 50 crosses over the transitional portion 531, the first roller 5021 contacts the transitional wedge 55. The transitional wedge 55 can compensate the drop occurring in the movement path of the image sensing module 50 due to the thickness difference between the first carrier 51 and the second carrier 52 to make the movement more stable and smooth. In an embodiment, the transitional portion 531 has a latch 5310 (located under the first carrier 51 and denoted by dotted lines as indicated in FIG. 5), which supports the first carrier 51. The similarities with the above embodiment are not repeated here.

The invention not only assures the achievement of dual scanning mode but also facilitates the assembly of products and avoids the dust entering the scanning device. The scanning device of the invention can be adapted in miniaturized products, has simple structure and is advantageous to the reduction in manufacturing cost. Examples of the scanning device of the invention include scanners, copiers, multi-functional machines, facsimile machines and so on.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning device, comprising:
an image sensing module comprising an image sensor for reading an image of an original document;
a first carrier for carrying the original document in a dynamic scanning mode, wherein in the dynamic scanning mode, the image sensing module remains still but the original document moves;
a second carrier for carrying the original document in a static scanning mode, wherein in the static scanning mode, the image sensing module moves but the original document remains still;
a holder for fixing the first carrier and the second carrier, wherein the holder comprises a transitional portion disposed between the first carrier and the second carrier;
wherein there are a first distance between the image sensor and the bottom surface of the first carrier and a second distance between the image sensor and the bottom surface of the second carrier, and the first distance is greater than the second distance.

2. The scanning device according to claim 1, wherein the first carrier has a first thickness, the second carrier has a second thickness, and the first thickness is smaller than the second thickness.

3. The scanning device according to claim 1, wherein the first carrier has a first refractive index, the second carrier has a second refractive index, and the first refractive index is greater than the second refractive index.

4. The scanning device according to claim 1, wherein the transitional portion has a latch, which supports the first carrier.

5. The scanning device according to claim 4, wherein the bottom surface of the latch is aligned with or higher than that of the second carrier.

6. The scanning device according to claim 1, wherein the image sensing module further comprises a spacer disposed at the two ends of the image sensor.

7. The scanning device according to claim 6, wherein the spacer is a slide block or a roller.

8. The scanning device according to claim 6, further comprising a guide rail disposed under the first carrier or at the two sides thereof, wherein the spacer is correspondingly disposed on the guide rail.

9. The scanning device according to claim 6, wherein the spacer comprises a first roller and a second roller disposed between the first roller and the image sensor, and the diameter of the first roller is greater than that of the second roller.

10. The scanning device according to claim 9, wherein in the dynamic scanning mode, the first roller contacts the first carrier, but the second roller does not contact the first carrier, and in the static scanning mode, the second roller contacts the second carrier, and the first roller is suspended.

11. The scanning device according to claim 10, wherein the first carrier has a first width, the second carrier has a second width, and the first width is greater than the second width.

12. The scanning device according to claim 10, wherein further comprising a transitional wedge disposed between the first carrier and the second carrier and located at the two sides of the transitional portion, and when the image sensing module crosses over the transitional portion, the first roller contacts the transitional wedge.

13. The scanning device according to claim 1, further comprising a driving unit for driving the image sensing module to move between the underneath of the first carrier and the underneath of the second carrier along the first direction, wherein during the course of movement, the image sensing module crosses over the transitional portion.

14. The scanning device according to claim 1, wherein the image sensor is a contact image sensor, or, both the first carrier and the second carrier are transparent glasses.

* * * * *